(12) United States Patent
Lee et al.

(10) Patent No.: US 7,778,464 B2
(45) Date of Patent: Aug. 17, 2010

(54) APPARATUS AND METHOD FOR SEARCHING FOR DIGITAL INK QUERY

(75) Inventors: Chung-shik Lee, Seoul (KR); Hee-seon Park, Seoul (KR); Ho-chul Shin, Goyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1122 days.

(21) Appl. No.: 11/056,104

(22) Filed: Feb. 14, 2005

(65) Prior Publication Data

US 2005/0182760 A1 Aug. 18, 2005

(30) Foreign Application Priority Data

Feb. 14, 2004 (KR) .................. 10-2004-0009862

(51) Int. Cl.
*G06K 9/18* (2006.01)
(52) U.S. Cl. .............. 382/185; 382/186; 382/190; 382/197
(58) Field of Classification Search ......... 382/185–187, 382/190, 197, 282, 188, 177, 181, 209; 707/3, 707/6
See application file for complete search history.

(56) References Cited

U.S. PATENT DOCUMENTS

| | | | | |
|---|---|---|---|---|
| 5,687,254 | A * | 11/1997 | Poon et al. | 382/229 |
| 5,729,629 | A * | 3/1998 | Dai | 382/187 |
| 5,757,959 | A | 5/1998 | Lopresti | |
| 5,832,474 | A * | 11/1998 | Lopresti et al. | 707/2 |
| 6,018,591 | A * | 1/2000 | Hull et al. | 382/186 |
| 6,275,611 | B1 | 8/2001 | Parthasarathy | |
| 6,539,113 | B1 * | 3/2003 | Van Kleeck | 382/185 |
| 6,560,360 | B1 | 5/2003 | Neskovic et al. | |

FOREIGN PATENT DOCUMENTS

CN 1096110 A 12/1994

(Continued)

OTHER PUBLICATIONS

Yamaguchi, O.; Fukui, K.; Pattern hashing—object recognition based on a distributed local appearance model. Image Processing. 2002. Proceedings. 2002 International Conference on Jun. 24-28, 2002 vol. 3, pp. III-329-III-332.*

(Continued)

*Primary Examiner*—Vikkram Bali
*Assistant Examiner*—Julian D Brooks
(74) *Attorney, Agent, or Firm*—Sughrue Mion, PLLC

(57) ABSTRACT

An apparatus and method for searching a handwritten memo, which is input by a user using a digital pen interface, for a word corresponding to the user's query. The apparatus includes a preprocessing unit which removes unnecessary portions from digital ink data of an input query phrase and an input memo to reduce an information amount, a feature extraction unit which extracts a feature vector from the digital ink data having the reduced information amount, and a query searching unit which searches the memo for a portion matched with the query phrase in units of segments. Therefore, an accurate result can be obtained quickly when an existing memo or document is searched for desired content by inputting a query phrase using a digital pen.

13 Claims, 9 Drawing Sheets

FOREIGN PATENT DOCUMENTS

| | | |
|---|---|---|
| JP | 9006924 A | 1/1997 |
| JP | 10-214267 A | 6/1998 |
| JP | 2000-250945 A | 9/2000 |
| KR | 2003-0003787 A | 1/2003 |
| KR | 2003-0043806 A | 6/2003 |
| KR | 2003-0066666 A | 8/2003 |

OTHER PUBLICATIONS

C.C. Tappert, Cursive Script Recognition by Elastic Matching, vol. 26, No. 6, Nov. 1982, pp. 765-771.

Bong-kee Sin, et al., Network-Based Approach to online Cursive Script Recognition, vol. 29, No. 2, Apr. 1999, pp. 321-328.

A.L. Koerich, et al., "Large Vocabulary Off-Line Handwriting Recognition: A Survey", Pattern Analysis and Applications Springer-Verlag UK, vol. 6, No. 2, 2003, pp. 97-121, XP002325286.

Bong-Kee Sin, et al., "Ligature Modeling for Online Cursive Script Recognition", IEEE Transactions on Pattern Analysis and Machine Intelligence IEEE Comput. Soc USA, vol. 19, No. 6, 1997, pp. 623-633, XP002325287.

* cited by examiner

APPARATUS AND METHOD FOR SEARCHING FOR DIGITAL INK QUERY

CROSS-REFERENCE TO RELATED APPLICATION

This application claims priority of Korean Patent Application No. 10-2004-0009862 filed on Feb. 14, 2004, in the Korean Intellectual Property Office, the disclosure of which is incorporated herein in its entirety by reference.

BACKGROUND OF THE INVENTION

1. Field of the Invention

The present invention relates to an apparatus for inputting a character, and more particularly, to an apparatus and method for searching a handwritten memo, which is input by a user using a digital pen interface, for a word corresponding to the user's query. The digital pen interface is an interface in which a traditional method of writing down on paper with a pen is implemented in a digital form using an apparatus such as a touch screen which senses a pressure or an electrical signal of a pen-type device contacting a screen and detects a motion trace of the pen-type device in an electronic form.

2. Description of the Related Art

In recent years, development of digital technology has brought a rapid prevalence of digital devices. One consequence of such development is that attempts at development of advanced devices are being made in various aspects, including miniaturization and reduced weight. In particular, increased portability of a keyboard and mouse interface, which has been in widespread use as an interface for digital devices over the several decades, together with the miniaturized digital devices, has become a critical issue. A need for substitute interfaces to solve this problem has been growing with each passing year, and a substitute interface using a voice, a pen, a gesture, and video has been continuously researched and developed. Particularly, it has been common to use pen or voice as a communication interface in society for several thousands of years due to spontaneity and great potential in expression.

A digital pen interface is an approach of applying a communicative habit of writing down characters, figures, symbols, etc. on paper with a pen, to a digital device. To digitize a pen interface, character recognition technology has been continuously researched. Character recognition technology is a technique of recognizing character information (hereinafter, referred to as "ink") input with a digital pen using a pattern recognition technique and converting the ink into an ASCII code used to express characters in a computer.

However, the character recognition technology is not widely spread as compared to the amount of research due to two major reasons. One reason is that character recognition speed is very slow. In order to allow a user to naturally perform writing (e.g., note-taking), recognition and processing need to be performed without a time delay while the user is writing. However, actually, a time delay of about 0.5 seconds occurs, so the user may feel irritated while writing.

The other reason is associated with a character recognition error. According to conventional character recognition technology, characters are recognized at an accuracy of about 90% in an actual situation. Even this accuracy can be accomplished only when various interface assistant devices for easily distinguishing characters are provided. When an error occurs while a user's writing is continuously recognized and processed, the user acts to correct the error, which disturbs continuity.

To overcome these problems of the character recognition technology in the field of pen interface, an approach which uses digital ink, i.e., a trace of a digital pen, without a character recognition procedure for determining an ASCII code corresponding to input digital ink has been proposed. As shown in FIG. 1, a detected pen's trace is stored in a digital form and displayed as it is so that a user can obtain information that he/she recorded. This method does not disturb the user's natural hand motion in writing down since character recognition is not performed. As a result, problems of the character recognition technology can be overcome.

However, in the above-described approach, since coded characters that can be recognized by a computer are not stored, the user needs to personally check all recorded information to search for desired information. To overcome this problem, a technique of searching for a medium recorded in the form of digital ink is required. According to such technique (hereinafter, referred to as a "digital ink search technique"), when a search query in the form of digital ink (hereinafter, referred to as a "query phrase") is input as shown in FIG. 2 in a situation where a plurality of memos recorded in the form of digital ink as shown in FIG. 1 (hereinafter, referred to as "memos") are present, memos including the content of the query phrase are displayed as a search result.

Conventional methods for digital ink search premise that a search unit is a word separated from other characters or that a gap between recorded words is sufficient to divide characters in word units.

When words are distinctly separated from each other in a query phrase and memos, a search can be easily processed by comparing similarities between the query phrase and memos using a method such as elastic matching disclosed in various existing documents. In this situation, since an object to be searched for is distinct, there is no problem in dividing characters into words, and speed does not matter. The elastic matching is well introduced by C. C. Tappert ["Cursive Script Recognition by Elastic Matching", IBM J. Research Development, V. 26, No. 6, pp. 765-771, 1982]. In this method, two objects are compared with each other, and a degree of similarity between the two objects is expressed by a numerical value.

However, actually, in most digital devices having a small input screen, characters and words are not sufficiently spaced to be easily separated from each other since a user usually inputs characters without spacing words due to restriction in space. Even when space is sufficient to input desired information, some users do not strictly space words. In such a situation where a search object cannot be easily identified, there exists a problem of determining a part of a memo to be compared with a query phrase.

SUMMARY OF THE INVENTION

The present invention provides a method of searching for a query phrase in memos generated using a digital pen.

The present invention also provides a spotting method using a particular portion of a query phrase to implement the above-described search method.

The present invention also provides a method using additional meta information to implement the above-described search method.

According to an aspect of the present invention, there is provided an apparatus for searching for a digital ink query. The apparatus comprises a preprocessing unit which removes unnecessary portions from digital ink data of an input query phrase and an input memo to reduce information amount, a feature extraction unit which extracts a feature vector from the digital ink data having the reduced information amount, and a query searching unit which searches the memo for a portion matched with the query phrase in units of segments.

The apparatus may further comprise a digitizer which receives a user's stroke, recognizes the stroke as the digital ink data, and transmits the digital ink data to the preprocessing unit.

Also, the apparatus may further comprise a display unit which highlights the portion matched with the query phrase when displaying a memo including the portion matched with the query phrase, and if no memo including the portion matched with the query phrase is present, informs a user that no memo including the query phrase exists using a message.

The apparatus may further comprise a memo database which when an input stroke is memo data, stores the memo data in the form of the feature vector extracted by the feature extraction unit, and when the query phrase is searched for, provides the stored memo data to the query searching unit.

Preferably, but not necessarily, the query searching unit comprises a segment divider which divides a character expressed by the feature vector into segments using temporal information regarding a temporal order in which the character is input and spatial separation information, a search order determiner which determines an order of searching for the divided segments, a spotting unit which compares a query phrase segment having a highest search order according to the determined search order with memo segments using a spotting table to find a cell indicating a degree of similarity exceeding a first predetermined threshold value, and a neighborhood searching unit which searches a neighborhood of the found cell and checks whether an entire query phrase includes a portion matched with a portion of the current memo.

The search order is preferably determined based on information amount of each segment.

The spotting table may comprise a plurality of cells having a plurality of levels of darkness, and a cell at an intersection between an i-th row and a j-th column stores a degree of similarity between an i-th segment of a query phrase and a j-th segment of an input memo.

The degree of similarity is preferably obtained using an elastic matching method.

When the neighborhood searching unit searches the neighborhood of the found cell, the neighborhood searching unit may perform a search in a diagonal direction of the found cell until a top and a bottom of the spotting table are encountered.

Also, when the neighborhood searching unit searches the neighborhood of the found cell, the neighborhood searching unit may perform a search in a diagonal direction of the found cell, determines candidates for a node to be subsequently selected using horizontal expansion and vertical expansion, and expands the search from a node indicating a highest similarity among the candidates according to a best first search method, until a top and a bottom of the spotting table are encountered.

Preferably, but not necessarily, the matched portion indicates a portion in the memo corresponding to a path of a search performed until the top and the bottom of the spotting table are encountered when a degree of accumulated similarity obtained from the path exceeds a second predetermined threshold value.

When a cell located in the diagonal direction among the candidates is selected as the subsequent node without expansion, a degree of accumulated similarity at the subsequent node is preferably, but not necessarily, expressed by:

$$\frac{l_i \cdot C_{S_i,T_{j_i}} + l_{i+1} \cdot C_{S_{i+1},T_{j_{i+1}}}}{l_i + l_{i+1}}$$

where $l_i$ indicates a length of a query phrase segment used at a current node, $l_{i+1}$ indicates a length of an expanded query phrase segment at the subsequent node, $C_{S_i,T_{j_i}}$ indicates a degree of similarity between an i-th segment in the query phrase and a $j_i$-th segment in the memo, and $C_{S_{i+1},T_{j_{i+1}}}$ indicates a degree of similarity between an (i+1)-th segment in the query phrase and a $j_{i+1}$-th segment in the memo.

In a case of vertical expansion using two segments, a degree of accumulated similarity may be expressed by:

$$\frac{l_i \cdot C_{S_i,T_{j_i}} + (l_{i+1} + l_{i+2}) \cdot C_{S_{i+1}\sim i+2,T_{j_{i+1}}}}{l_i + l_{i+1} + l_{i+2}},$$

where $l_i$ indicates a length of a query phrase segment used at a current node, $l_{i+1}$ indicates a length of an expanded query phrase segment at a first subsequent node, $l_{i+2}$ indicates a length of an expanded query phrase segment at a second subsequent node, $C_{S_i,T_{j_i}}$ indicates a degree of similarity between an i-th segment in the query phrase and a $j_i$-th segment in the memo, and $C_{S_{i+1\sim i+2},T_{j_{i+1}}}$ indicates a degree of similarity between a combination of an (i+1)-th segment and an (i+2)-th segment in the query phrase and a $j_{i+1}$-th segment in the memo.

In a case of horizontal expansion using two segments, a degree of accumulated similarity may be expressed by:

$$\frac{l_i \cdot C_{S_i,T_{j_i}} + l_{i+1} \cdot C_{S_{i+1},T_{(j_{i+1})\sim(j_{i+1}+1)}}}{l_i + l_{i+1}},$$

where $l_i$ indicates a length of a query phrase segment used at a current node, $l_{i+1}$ indicates a length of an expanded query phrase segment at a first subsequent node, $l_{i+2}$ indicates a length of an expanded query phrase segment at a second subsequent node, $C_{S_i,T_{j_i}}$ indicates a degree of similarity between an i-th segment in the query phrase and a $j_i$-th segment in the memo, and $C_{S_{i+1},T_{(j_{i+1})\sim(j_{i+1}+1)}}$ indicates a degree of similarity between the (i+1)-th segment in the query phrase and a combination of the $j_{i+1}$-th segment and a ($j_{i+1}$+1)-th segment in the memo.

When the query phrase and the memo are divided into characters, the search order is preferably, but not necessarily, determined only with respect to segments corresponding to start portions or end portions of characters in the query phrase.

According to whether the segment having the highest search order corresponds to a start or an end portion of a character in the query phrase, the segment having the highest search order is preferably, but not necessarily, compared with only segments corresponding to start or end portions of characters in the memo.

According to another aspect of the present invention, there is provided a method of searching for a digital ink query. The method comprises removing unnecessary portions from digital ink data of an input memo to reduce information amount, extracting a feature vector from memo data having the reduced information amount and storing the feature vector in a memo database, removing unnecessary portions from digital ink data of an input query phrase to reduce information amount, extracting a feature vector from query phrase data having reduced information amount, and searching the memo for a portion matched with the query phrase in units of segments.

In the above-described method, the searching may comprise dividing a character expressed by the feature vector into segments using temporal information regarding a temporal order in which the character is input and spatial separation information, determining an order of searching for the divided segments, comparing a query phrase segment having a highest search order according to the determined search order with memo segments using a spotting table to find a cell indicating a degree of similarity exceeding a predetermined threshold value, and searching a neighborhood of the found cell and checking whether an entire query phrase includes a portion matched with a portion of the current memo.

BRIEF DESCRIPTION OF THE DRAWINGS

The above and other features and advantages of the present invention will become more apparent by describing in detail exemplary embodiments thereof with reference to the attached drawings in which:

FIG. 4 illustrates an example of a memo displayed to a user according to the present invention;

DETAILED DESCRIPTION OF EXEMPLARY EMBODIMENTS OF THE INVENTION

Figures 1, 2:
FIG. 1 illustrates an example of a digital ink memo.
FIG. 2 illustrates an example of a digital ink query phrase.

The present invention will now be described more fully with reference to the accompanying drawings, in which exemplary embodiments of the invention are shown. This invention may, however, be embodied in many different forms and should not be construed as being limited to the embodiments set forth herein. Rather, these embodiments are provided so that this disclosure will be thorough and complete, and will fully convey the concept of the invention to those skilled in the art. In the drawings, the same reference numerals represent the same elements.

Figure 3:
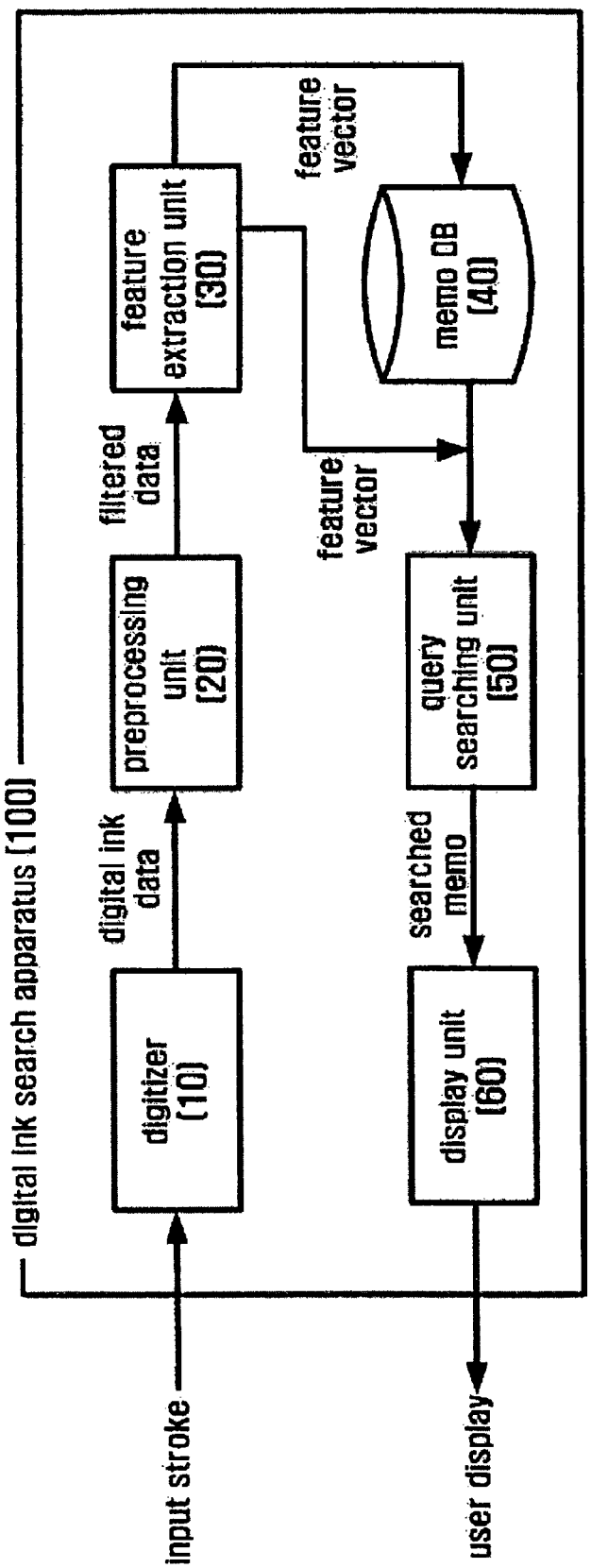
FIG. 3 is a block diagram of a digital ink search apparatus according to an embodiment of the present invention.

FIG. 3 is a block diagram of a digital ink search apparatus according to an embodiment of the present invention. A digital ink search apparatus 100 includes a digitizer 10, a preprocessing unit 20, a feature extraction unit 30, a memo database (DB) 40, a query searching unit 50, and a display unit 60.

The digitizer 10 receives and converts a user's stroke into binary pixel data, i.e., digital ink data, and transmits the digital ink data to the preprocessing unit 20. The stroke is a unit in which a user writes something without lifting up a pen. The digitizer 10 may have a resolution of 150 points per inch and transmit the digital ink data to the preprocessing unit 20 at a speed of 50 points per second.

The preprocessing unit 20 removes unnecessary portions from the digital ink data to reduce information amount. The unnecessary portions are produced due to an imperfection of a user's stroke input, diversity of a character size, diversity of writing speed, etc. Such preprocessing may include De-hooking, resampling, etc. De-hooking is a process of removing a hook appearing at the start and the end of a stroke during pen input. Resampling is a process of removing points from a portion other than a portion having a great change to reduce information amount with minimized distortion of information.

The feature extraction unit 30 extracts a feature vector from data filtered through preprocessing. The feature vector may include information such as an angle of a line connected between points, the length of the line, etc. Other various types of information may be used as feature information. Feature extraction may be performed using one of various conventional methods, for example, a feature extraction method suggested by B. K. Shin, J. Y. Ha, S. C. Oh, and Kim J. H ["Network-Based Approach to Online Cursive Script Recognition", IEEE Trans. On Systems, Man and Cybernetics, Part B, V. 29, Issue 2, 1999].

A stroke input by a user may be "memo data" or a "query phrase" which is used to search for a match in the memo data. When the input stroke is memo data, the memo DB 40 stores the memo data in the form of the feature vector extracted by the feature extraction unit 30.

However, when the input stroke is a query phrase, the feature vector extracted by the feature extraction unit 30 is input to the query searching unit 50 without being stored in the memo DB 40.

The query searching unit 50 searches memo data stored in the memo DB for a portion matched with the query phrase in units of segments using a predetermined matching algorithm and transmits a search result to the display unit 60.

Figure 4:
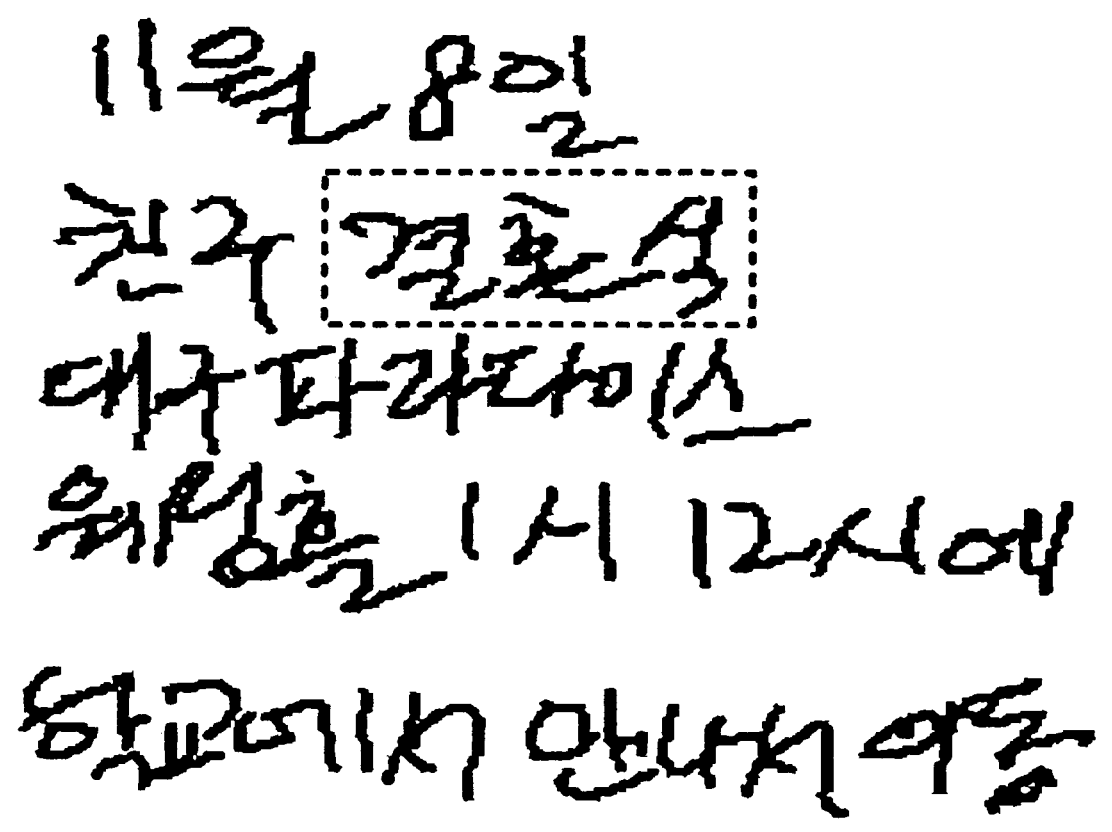

The display unit 60 displays a memo including the portion matched with the query phrase and highlights the portion matched with the query phrase. If no memo including the portion matched with the query phrase is present, the display unit 60 displays a message informing the user of the fact that no memo including the query phrase exists. FIG. 4 illustrates an example of a memo displayed to the user.

Figure 5:
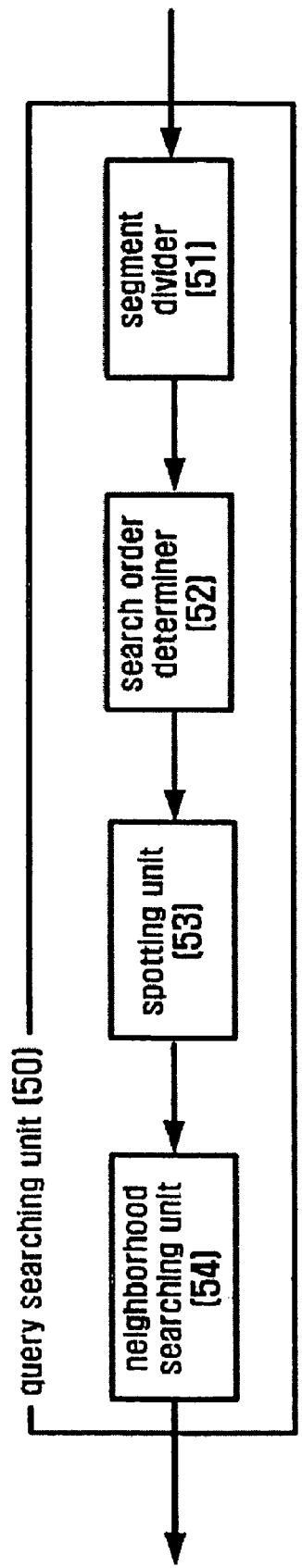
FIG. 5 is a block diagram of a query phrase searching unit shown in FIG. 3.

FIG. 5 is a block diagram of the query searching unit 50. The query searching unit 50 includes a segment divider 51, a search order determiner 52, a spotting unit 53, and a neighborhood searching unit 54.

The segment divider 51 divides a character expressed by the feature vector into segments using temporal information regarding the temporal order in which the character is input and spatial information regarding spatial separation. A segment may be defined as a portion separated without continuity from other portions in a character input by a user. Accordingly, the segment may be a phoneme such as a consonant or a vowel in Korean and may be an alphabet letter in English. However, according to a user's handwriting, two phonemes may be recognized as a single segment, and a single phoneme may be recognized as two segments. Accordingly, even when the same characters are input, results of division may be different according to a user's handwriting.

Here, it will be noticed that a portion is separated from other portions in defining the segment means that the portion is separated temporally as well as spatially. For example, referring to FIG. 2, "ㄹ"in "결"is spatially connected to"오" in "호" but they are separated temporally. When a user inputs a memo or a query phrase through the digitizer 10, the digitizer 10 can get information regarding an order in which a stroke is input as well as information regarding a final input shape of the memo or the query phrase. When these two types of information are used, since "ㅎ" is separately input after "ㄹ"is input, "ㄹ"and "오"are not combined into a single segment.

Various references may be used for segmental division. For example, when a pen device is detached from a surface of the digitizer 10, it may be recognized that a single segment is completed, and a next segment will start. In English, division may be performed on the basis of a local maximum point and a local minimum point or on the basis of a position of a ligature through ligature analysis. One among various conventional methods may be used to recognize a segment in the present invention.

Figure 6:
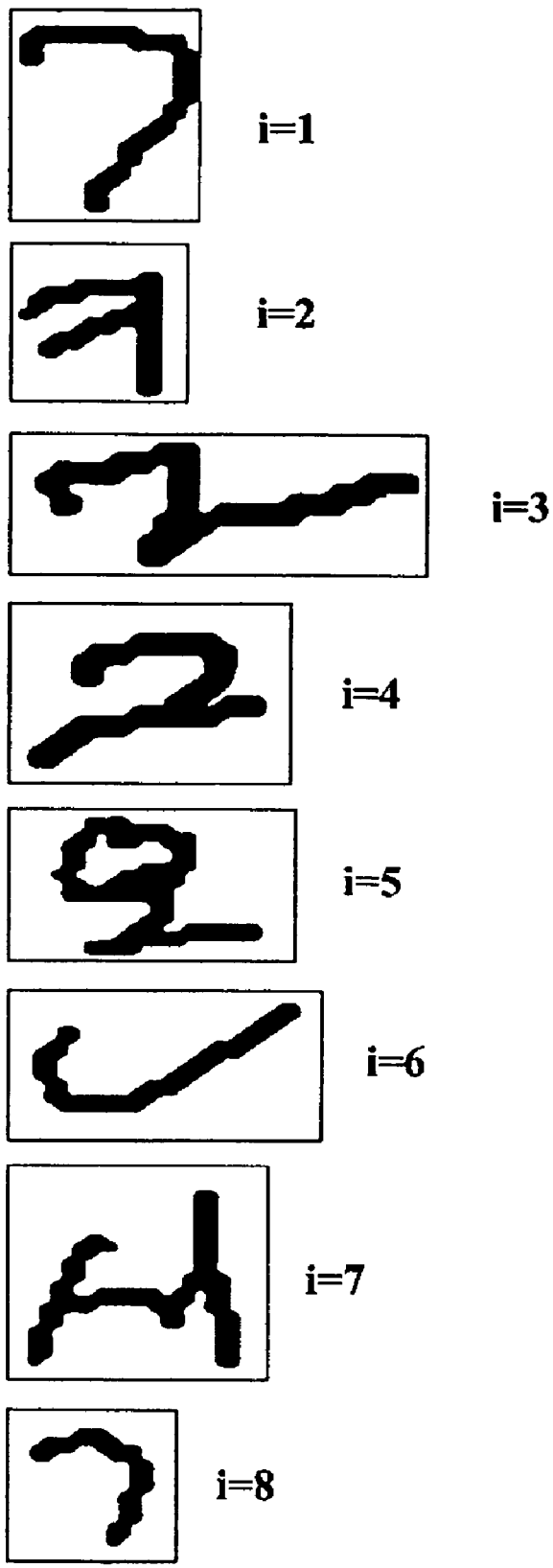
FIG. 6 illustrates an example in which a query phrase is divided into segments.

FIG. 6 illustrates an example in which the query phrase shown in FIG. 2 is divided into segments. The segments are arranged in temporal order in which a user inputs the segments to the digitizer 10. A value of "i" indicates the arranged sequence of each segment. It will be noticed that the arranged sequence is just a temporal input sequence not a search sequence.

Alternatively, a single stroke may be defined as a segment. In this case, characters may be divided into too many segments, thereby deteriorating search performance. However, when many instances of spacing are not required in a writing method, for example, when English characters are written in an italic style, it will be more efficient to define a single stroke as a segment.

The search order determiner 52 determines the order of searching for the segments divided by the segment divider 51. To derive a significant result from a spotting procedure performed by the spotting unit 53, two basic conditions need to be satisfied. Firstly, complexity must be able to be reduced satisfactorily. Secondly, a spotting result must be meaningful. To satisfy these two conditions, when the order of performing spotting on the segments divided by the segment divider 51 is determined, priority is given to segments that can satisfy the two conditions among the divided segments. To satisfy the first condition, a portion corresponding to a segment needs to be significantly small for the entire query phrase. To satisfy the second condition, a portion corresponding to a segment must not be a simple pattern but is preferably a pattern that does not frequently appear.

Figure 7:
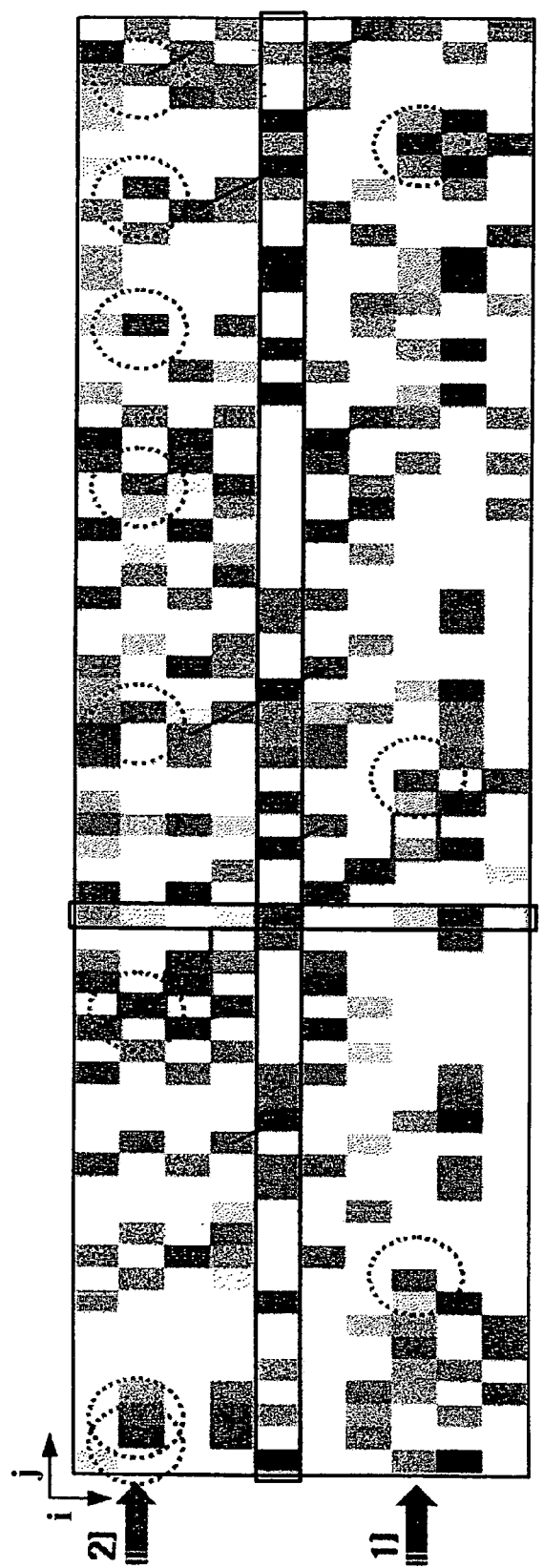
FIG. 7 illustrates an example of a spotting table according the present invention.

Referring to FIG. 7, which will be described in more detail later, a total of 3 cells are spotted when spotting is performed using a line 1) while a total of 8 cells are spotted when spotting is performed using a line 2). More specifically, false positives more frequently occur when spotting is performed using the line 2) than when spotting is performed using the line 1). However, when spotting is performed using the line 1), a probability of overlooked cells increases. Accordingly, it is necessary to divide the query phrase and determine the spotting order such that a compromise is made between the two conditions.

Figure 8:
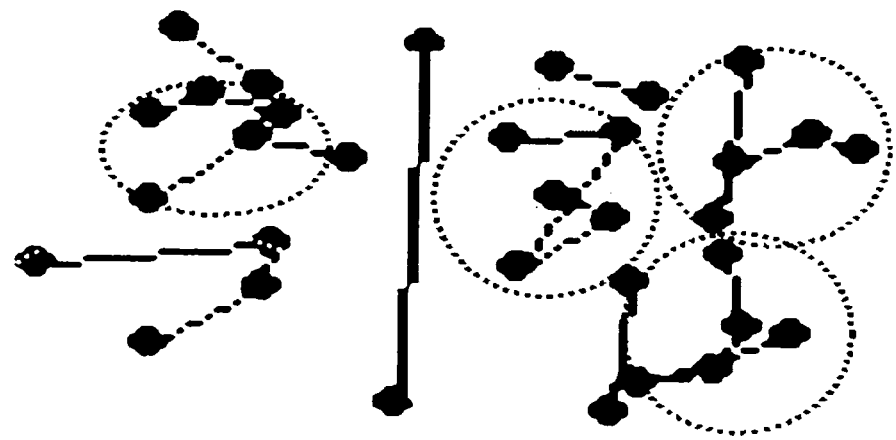
FIG. 8 illustrates a method of determining the priority order of segments according to the information amount of each segment, according to the present invention.

FIG. 8 illustrates a method of determining the priority order of segments according to the information amount of each segment, according to the present invention. The information amount of each segment is determined using the number of points obtained after preprocessing performed by the preprocessing unit 20. In other words, when a segment comprises many points, the segment is determined as having a large information amount and is given priority of search.

In a query phrase shown in FIG. 8, a total of 4 segments comprise 5 points and have the same priority. The order of using the 4 segments in a spotting procedure may be determined using random selection.

The spotting unit 53 compares a segment having the highest search order in the query phrase with memo segments using the spotting table to find cells exceeding a threshold value.

Spotting is a process of scanning a search object in units of segments of a query phrase and is used to avoid the complexity of comparing a search object in its entirety.

The biggest problem in searching for digital ink is that it is not easy to divide a memo, i.e., a search object, into particular units for a search. For example, to determine whether the query phrase, "결혼식", shown in FIG. 2 is present in the memo shown in FIG. 1, it is needed to extract sequential combinations of all of available strokes from the memo and compare the query phrase with the extracted sequential combinations. In other words, the query phrase "결혼식"may need to be compared with "친구 결혼식", "결혼식대구", "파라다이스", "구결혼" and even "ㅜ결ㅎ"including only a part of a complete character since a border between characters is difficult to be accurately identified. Such comparison method incurs too high complexity to be actually used.

Accordingly, a method of determining whether a query phrase is present in a memo and detecting a portion corresponding to the query phrase in the memo with a small number of comparisons is desired.

In an embodiment of the present invention, to realize a high-speed search, only a particular portion of a query phrase instead of all of available candidates is extracted and searched for, and when the particular portion has a high similarity as a result of comparison, more detailed search is further performed. The following description concerns such method of realizing a high-speed search.

As shown in FIG. 7, search is performed with only a part of a query phrase using a spotting method so that a comparison unit is remarkably reduced, thereby greatly decreasing a search time. In addition, the number of comparisons between the query phrase and a search object can be reduced.

Figure 9:
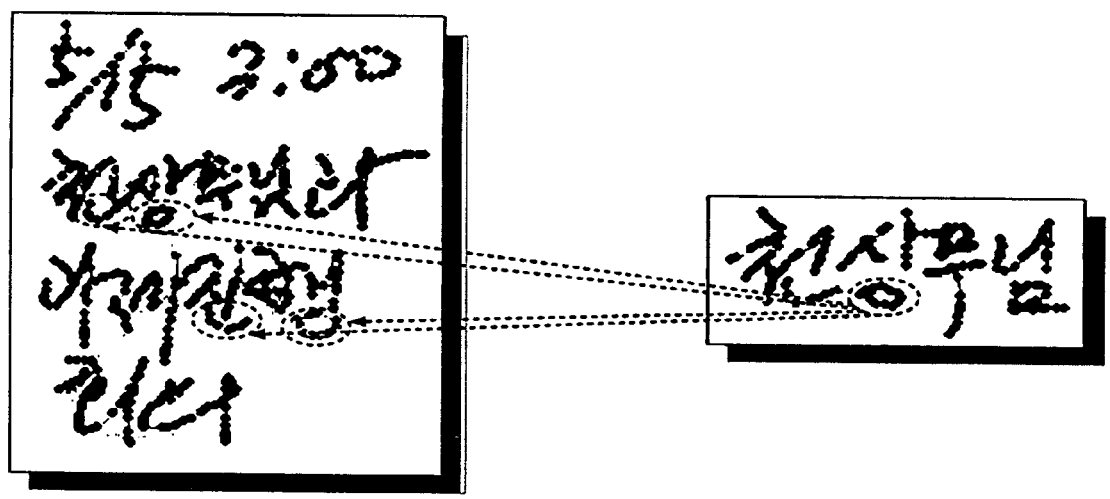
FIG. 9 illustrates an example in which similarities between a particular segment of a query phrase and segments of a memo are compared, according to the present invention.

For example, as shown in FIG. 9, a particular segment (e.g., a final consonant "ㅇ") of a query phrase is compared with all segments of an entire memo. As a result of the comparison, final consonants in characters "천", "상", "진", and "행"may be detected as being similar to the particular portion "ㅇ" of the query phrase. Thereafter, around these spotted points, comparison of other segments, i.e., candidate expansion, is performed so that the entire query phrase can be compared with the search object.

FIG. 7 illustrates an example of a spotting table used to easily perform a spotting procedure. The spotting table includes a plurality of rectangular cells having a plurality of levels of darkness. Each of the cells is defined by a row and a column. The row indicates segments into which a query phrase is divided according to a predetermined reference, and the column indicates segments into which a search object, i.e., a memo, is divided into according to a predetermined reference. In other words, a cell at an intersection between an i-th row and a j-th column indicates a degree of similarity between an i-th segment of the query phrase and a j-th segment of the memo.

The darkness of each cell indicates a degree of similarity between a segment of the query phrase and a segment of the memo. High darkness indicates a high similarity between corresponding two segments.

In a more specific spotting procedure, memo segments matched with a query phrase segment having a highest search priority determined by the search order determiner 52 are searched for in a horizontal direction (i.e., in a direction in which "j" increases). If no memo segments are matched with the query phrase segment, memo segments matched with a query phrase segment having a second highest search priority are searched for in the same manner.

To determine whether two segments are matched with each other, a degree of similarity between a segment of a query phrase currently subjected to a spotting procedure and a segment of a memo is normalized using a value [Min, Max]. When a similarity value obtained through the normalization exceeds a predetermined threshold value, the two segments are determined as being matched with each other. Such a cell indicating matching between two segments is referred to as a spotted cell.

When the similarity value is less than the predetermined threshold value, a next memo segment is selected, and the same operation is repeated. A similarity value can be obtained using various ways of normalizing a result of comparing two segments according to the elastic matching method, for example. Similarity values calculated during the spotting procedure are stored in the form of a similarity table so that redundant calculation is prevented.

The neighborhood searching unit 54 searches the neighborhood of the spotted cell to check whether the entire query phrase includes a portion matched with a portion of the current memo. When it is determined that a memo segment matched with a query phrase segment exists as a result of the spotting procedure performed by the spotting unit 53, that is, when a spotted cell is found in the spotting table, similarity values are calculated with respect to cells encountered when moving in diagonal directions from the spotted cell to the top and bottom of the spotting table and are recorded in the corresponding cells, respectively, in the form of color.

A diagonal direction indicates an upper left direction or a lower right direction. Moving in the upper left direction indicates a shift from a current cell having a coordinate value, e.g., (i, j), to a cell having a coordinate value (i−1, j−1). In other words, a query phrase segment previous to a current query phrase segment is compared with a memo segment previous to a current memo segment. Moving in the lower right direction indicates moving to a cell having a coordinate value (i+1, j+1) when a current cell has a coordinate value (i, j). That is, a query phrase segment next to the current query phrase segment is compared with a memo segment next to the current memo segment. Such above-described procedure is referred to as a neighborhood search.

Figure 10A:
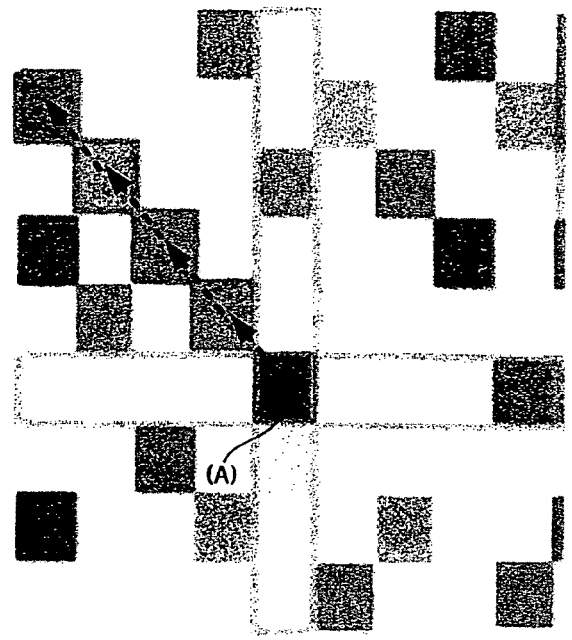
FIG. 10A illustrates a neighborhood search procedure according to the present invention.

For example, as shown in FIG. 10A, while moving in an upper left direction from a spotted cell (A), a similarity value is calculated at each encountered cell and recorded in the cell. Thereafter, while moving in a lower right direction from the spotted cell (A), a similarity value is calculated at each encountered cell and recorded in the cell.

Calculating similarities in a diagonal direction is performed on the premise that query phrase segments one-to-one correspond to memo segments. However, in an actual handwritten character, a single segment may include a plurality of phonemes, or a single phoneme may be recognized as a plurality of segments.

To solve these problems, it is preferable to extend a search range from a spotted cell based on similarity information and length information of each segment.

Figure 10B:
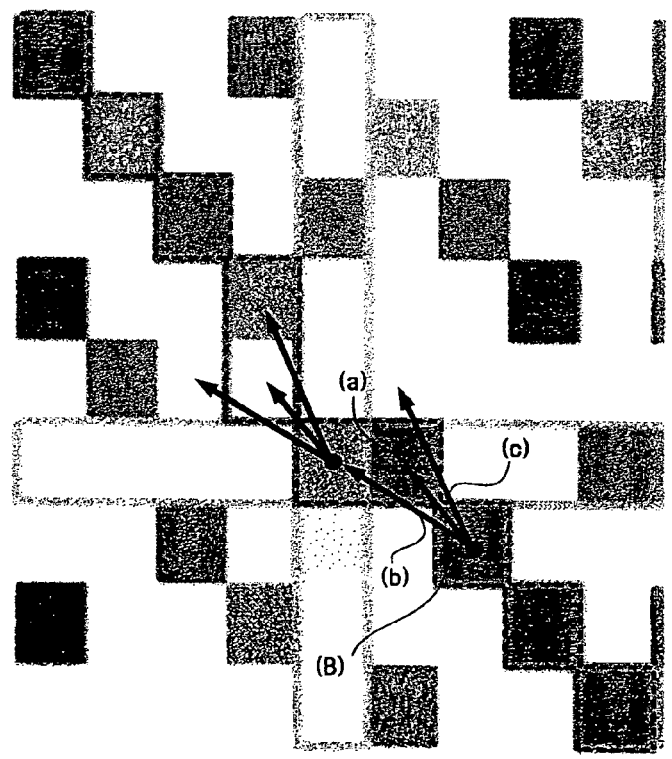
FIG. 10B illustrates an expansion neighborhood search procedure according to the present invention.

FIG. 10B illustrates an expansion search from a spotted cell. In a range framed in dotted-line, query phrase segments correspond to memo segments. Moving in a direction (a) from a spotted cell (B), that is, no expansion, indicates comparing a single query phrase segment with a single memo segment. Moving in a direction (b) from the spotted cell (B), i.e., horizontal expansion indicates comparing a single query phrase segment with a combination of two memo segments. Moving in a direction (c) from the spotted cell (B), i.e., vertical expansion indicates comparing a combination of two query phrase segments with a single memo segment.

Horizontal expansion is provided for a case where two phonemes in a query phrase are recognized as a single segment and a single phoneme in a memo is recognized as a single segment. Vertical expansion is provided for a case where a single phoneme in a query phrase is recognized as a single segment and two phonemes in a memo are recognized as a single segment.

In order to appropriately handle merged phonemes in handwriting, during a single-step expansion, possible cases of merged phonemes are tested. Among possible expansion results, a result having a highest similarity is detected and expansion is continued from the detected result using a best first search algorithm. The above-described operation is referred to as an expansion neighborhood search. When a two-step expansion (two expansions in the horizontal direction and two expansions in the vertical direction) is used as shown in FIG. 10B, three node candidates are present, and one node candidate having a highest similarity of the three node candidates is selected. When a three-step expansion is used, five node candidates may be present.

Figure 11:
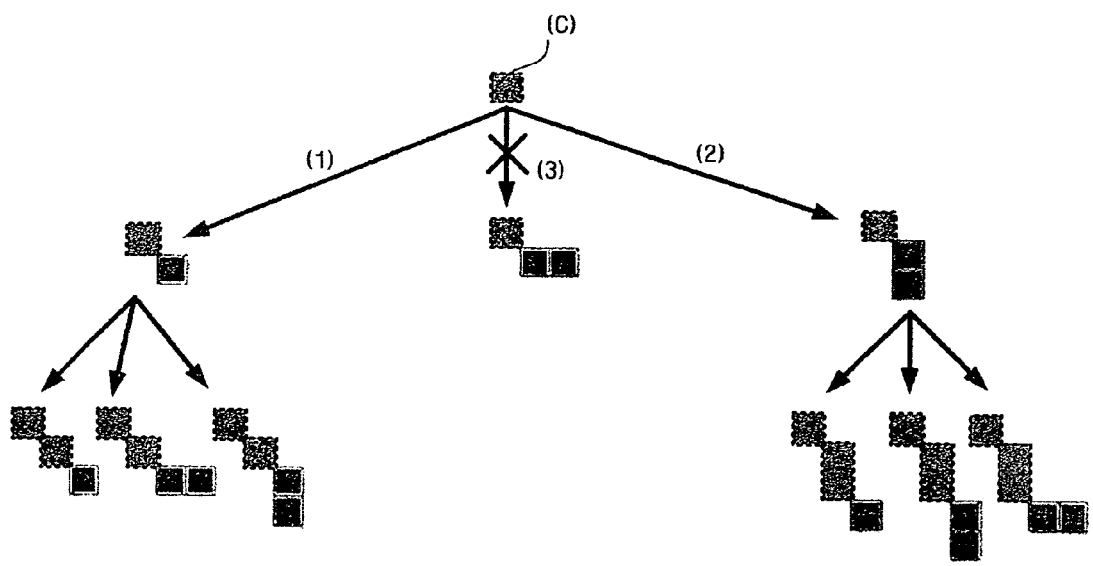
FIG. 11 is a diagram in which the expansion neighborhood search procedure is expressed in a tree form.

An algorithm shown in FIG. 10B can be expressed in the form of a tree as shown in FIG. 11. This search procedure is continued in the upper left direction and the lower right direction before the boundary of the spotting table is encountered. FIG. 11 illustrates an example in which a search is performed in a lower right direction from a spotted cell. In FIG. 11, a single dotted quadrangle corresponds to a single elastic matching operation and is defined as a node. A single node may include one or more cells.

During such expansion neighborhood search, a degree of similarity may be calculated as follows. When a degree of similarity at a node (C) shown in FIG. 11 is expressed as $C_{S_i,T_{ji}}$, if a single segment of a query phrase is expanded as illustrated by (1), a degree of accumulated similarity can be calculated in a normalized form in proportional to a length of each segment as shown in Formula [1].

$$\frac{l_i \cdot C_{S_i,T_{ji}} + l_{i+1} \cdot C_{S_{i+1},T_{ji+1}}}{l_i + l_{i+1}} \qquad [1]$$

Here, $l_i$ and $l_{i+1}$ respectively indicate a length of a query phrase segment used at a current node and a length of an expanded query phrase segment at a subsequent node, $C_{S_i,T_{ji}}$ indicates a degree of similarity between an i-th segment in a query phrase and a $j_i$-th segment in a search object, i.e., a memo, and $C_{S_{i+1},T_{ji+1}}$ indicates a degree of similarity between an (i+1)-th segment in the query phrase and a $j_{i+1}$-th segment in the memo.

Similarly, when expansion is performed using two segments of the query phrase as illustrated by (2), a degree of accumulated similarity is calculated according to Formula [2].

$$\frac{l_i \cdot C_{S_i,T_{j_i}} + (l_{i+1} + l_{i+2}) \cdot C_{S_{i+1 \sim i+2}, T_{j_{i+1}}}}{l_i + l_{i+1} + l_{i+2}} \quad [2]$$

Here, $l_{i+2}$ indicates a length of an expanded query phrase segment at a second subsequent node, and $C_{S_{i+1 \sim i+2}, T_{j_{i+1}}}$ indicates a degree of similarity between a combination of the (i+1)-th segment and an (i+2)-th segment in the query phrase and the $j_{i+1}$-th segment in the memo.

Similarly, when expansion is performed using two segments of the query phrase as illustrated by (3), a degree of accumulated similarity is calculated according to Formula [3].

$$\frac{l_i \cdot C_{S_i,T_{j_i}} + l_{i+1} \cdot C_{S_{i+1},T_{(j_{i+1}) \sim (j_{i+1}+1)}}}{l_i + l_{i+1}} \quad [3]$$

Here, $C_{S_{i+1}, T_{(j_{i+1}) \sim (j_{i+1}+1)}}$ indicates a degree of similarity between the (i+1)-th segment in the query phrase and a combination of the $j_{i+1}$-th segment and a $(j_{i+1}+1)$-th segment in the memo.

As such, among several possibilities for expansion results, a result having a highest similarity is detected and expansion is continued from the detected result using a best first search algorithm. For example, when searches are performed in directions (1), (2), and (3) as shown in FIG. 11, if the degree of accumulated similarity obtained in the search performed in the direction (1) is highest among results of performing searches up to the current point, a single-step expansion search from the search result obtained in the direction (1) is performed. When the accumulation similarity exceeds a predetermined threshold value, a search is not continued, but a search path is pruned, as illustrated by (3).

When a degree of accumulated similarity obtained after an expansion search procedure is performed until ends in search directions (i.e., the top and the bottom of the spotting table) are encountered, exceeds the threshold value, the search is stopped, and a portion corresponding to the path of the expansion search in the memo is selected as an optimal match portion.

However, when no path giving a degree of accumulated similarity exceeding the threshold value is found after the spotting procedure and the neighborhood search procedure, it may be concluded that a portion similar to the query phrase does not exist in the memo, or a path giving a greatest accumulated similarity among paths of neighborhood searches may be provided as a candidate.

When the above-described spotting method is used, a portion of a query phrase is sequentially compared with all portions of an entire memo. However, if additional information (hereinafter, referred to as meta information) that can be derived from actual handwriting information can be obtained, a search can be performed more quickly by comparing a portion of a query phrase with only a portion of a memo, i.e., a search object, that has characteristics agreeing with characteristics of a query phrase.

For example, character division information may be used as meta information. When input digital ink is to be divided into characters, result of the character division may not be 100% accurate, but highly accurate character division may be obtained using various types of information. Since this character division information is not exact, it cannot be used in a subsequent process but may be used to avoid insignificant comparison during the spotting procedure in an embodiment of the present invention.

Figure 12:
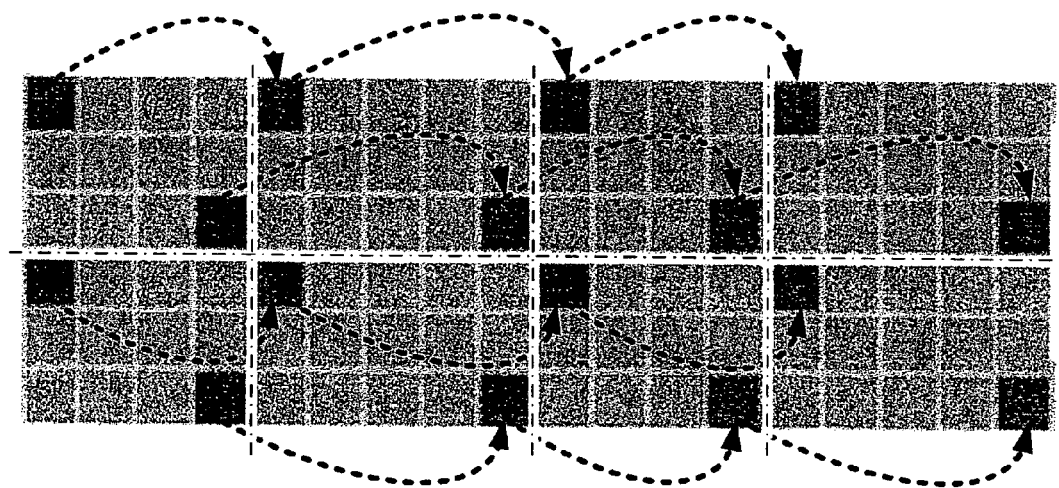
FIG. 12 illustrates a spotting method using character division information as meta information according to the present invention.

FIG. 12 illustrates a spotting method using character division information as meta information according to the present invention. As described above, in FIG. 12, each quadrangle defined by a row and a column indicates a degree of similarity between a portion of a query phrase and a portion of a memo.

When character division information is given as meta information, borders among characters can be marked like dashed dot line lines shown in FIG. 12. If the character division information is given as meta information, the operation (i.e., segment division) of the segment divider 51, the operation (i.e., search order determination) of the search order determiner 52, and the operation (i.e., spotting) of the spotting unit 53 will be changed.

More specifically, only segments corresponding to a start or an end portion of each character based on the character division information are used for spotting. For example, referring to FIG. 12, when a query phrase is divided into two characters, a total of start and end segments of the characters is 4. Accordingly, the search order of the four segments is determined based on information amount.

Next, a selective search is performed using the character division information. For example, when a current segment under spotting corresponds to a start portion of a character in the query phrase, the segment of the query phrase is compared with only segments corresponding to a start portion of each character in the memo. Similarly, when a current segment of the query phrase corresponds to an end portion of a character, the current segment of the query phrase is compared with only segments corresponding to an end portion of each character in the memo. Such comparison is illustrated by arrows in FIG. 12.

In another embodiment of the present invention, a character may be provisionally divided into segments, and based on topology information of a feature segment, only segments approximately located at a portion corresponding to the topology information of the feature segment may be compared with the feature segment. In case of English, a query phrase is provisionally divided into words, and division information may be used as meta information.

When a method using meta information is employed, search performance may be decreased. However, when this method is applied to users' various handwriting patterns, a search speed is remarkably increased compared to a slight decrease in search performance.

The present invention may also be embodied as a computer-readable recording medium having a program recorded thereon.

While exemplary embodiments of the present invention have been described above, it should be understood that they have been provided as examples only. Thus, those skilled in the art will recognize that the invention can be practiced with modification within the spirit and scope of the appended claims.

According to the present invention, when desired content is searched for in an existing memo or document by inputting a query phrase using a digital pen, an accurate result can be obtained quickly.

In addition, the present invention allows a user to quickly input information without a delay caused by a character recognition operation, thereby satisfying a user.

What is claimed is:

1. An apparatus for searching for a digital ink query, comprising:
   a preprocessing unit which removes at least one unnecessary portion from digital ink data of at least one of an input query phrase and an input memo to reduce an amount of information of the digital ink data;
   a feature extraction unit which extracts a feature vector from the reduced digital ink data;
   a query searching unit which searches the input memo in units of segments for a portion of the input memo that matches a segment of the input query phrase; and
   a memo database which, when an input stroke is memo data, stores the memo data in the form of the feature vector extracted by the feature extraction unit, and when the query phrase is searched for, provides the stored memo data to the query searching unit,
   wherein the digital ink data comprises binary pixel data that is digitized from the at least one of the input query phrase and input memo,
   wherein the query searching unit comprises:
      a segment divider which divides a character expressed by the feature vector into divided segments using temporal information related to a temporal order in which the character is input and spatial separation information;
      a search order determiner which determines an order of searching for the divided segments;
      a spotting unit which compares a query phrase segment having a highest search order according to the determined search order with memo segments using a spotting table to find a cell indicating a first degree of similarity exceeding a first predetermined threshold value; and
      a neighborhood-searching unit which searches a neighborhood of the found cell and checks whether an entire query phrase includes a portion matched with a portion of the input memo,
   wherein, when the neighborhood searching unit searches the neighborhood of the found cell, the neighborhood searching unit performs a search in a diagonal direction from the found cell, determines candidates for a node to be subsequently selected using horizontal expansion and vertical expansion, and expands the search from a node indicating a highest similarity among the candidates according to a best first search method, until a top and a bottom of the spotting table are encountered,
   wherein the matched portion indicates a portion in the input memo corresponding to a path of the search performed until the top and the bottom of the spotting table are encountered, when a degree of accumulated similarity obtained from the path exceeds a second predetermined threshold value, and
   wherein when a cell located in the diagonal direction among the candidates is selected as the subsequent node without expansion, the degree of accumulated similarity at the subsequent node is expressed by:

$$\frac{l_i \cdot C_{S_i,T_{j_i}} + l_{i+1} \cdot C_{S_{i+1},T_{j_{i+1}}}}{l_i + l_{i+1}},$$

where $l_i$ indicates a length of a query phrase segment used at a current node, $l_{i+1}$ indicates a length of an expanded query phrase segment at the subsequent node, $C_{S_i,T_{j_i}}$ indicates a second degree of similarity between an i-th segment in the input query phrase and a $j_i$-th segment in the input memo, and $C_{S_{i+1},T_{j_{i+1}}}$ indicates a third degree of similarity between an (i+1)-th segment in the input query phrase and a $j_{i+1}$-th segment in the input memo.

2. The apparatus of claim 1, further comprising a digitizer which receives a user's stroke, recognizes the stroke as the digital ink data, and transmits the digital ink data to the preprocessing unit.

3. The apparatus of claim 1, further comprising a display unit which highlights the portion matched with the query phrase when displaying the input memo including the portion matched with the query phrase, and if no memo including the portion matched with the query phrase is present, informs a user that no memo including the query phrase exists, using a message.

4. The apparatus of claim 1, wherein the spotting table comprises a plurality of cells having a plurality of levels of darkness, and a cell at an intersection between an i-th row and a j-th column stores a degree of similarity between an i-th segment of the input query phrase and a j-th segment of the input memo.

5. The apparatus of claim 1, wherein the degree of similarity is obtained using an elastic matching method.

6. The apparatus of claim 1, wherein, when the neighborhood searching unit searches the neighborhood of the found cell, the neighborhood searching unit performs a search in a diagonal direction from the found cell until a top and a bottom of the spotting table are encountered.

7. The apparatus of claim 1, wherein, when the neighborhood searching unit searches the neighborhood of the found cell, the neighborhood searching unit performs a search in a diagonal direction from the found cell, determines candidates for a node to be subsequently selected using horizontal expansion and vertical expansion, and expands the search from a node indicating a highest similarity among the candidates according to a best first search method, until a top and a bottom of the spotting table are encountered.

8. The apparatus of claim 7, wherein the matched portion indicates a portion in the input memo corresponding to a path of the search performed until the top and the bottom of the spotting table are encountered, when a degree of accumulated similarity obtained from the path exceeds a second predetermined threshold value.

9. The apparatus of claim 1, wherein, when the input query phrase and the input memo are divided into characters, the search order is determined only with respect to segments corresponding to one of start portions and end portions of characters in the input query phrase.

10. The apparatus of claim 9, wherein the segment having the highest search order is compared with only segments corresponding to one of start and end portions of characters in the input memo, according to whether the segment having the highest search order corresponds to one of a start portion and an end portion of a character in the input query phrase.

11. The apparatus of claim 1, wherein the segment comprises a portion of the input query phrase that is less than the entire input query phrase.

12. An apparatus for searching for a digital ink query, comprising:
   a preprocessing unit which removes at least one unnecessary portion from digital ink data of at least one of an input query phrase and an input memo to reduce an amount of information of the digital ink data;
   a feature extraction unit which extracts a feature vector from the reduced digital ink data;
   a query searching unit which searches the input memo in units of segments for a portion of the input memo that matches a segment of the input query phrase; and a memo database which, when an input stroke is memo data, stores the memo data in the form of the feature vector extracted by the feature extraction unit, and when the query phrase is searched for, provides the stored memo data to the query searching unit, wherein the digital ink data comprises binary pixel data that is digitized from the at least one of the input query phrase and input memo, wherein the query searching unit comprises:

a segment divider which divides a character expressed by the feature vector into divided segments using temporal information related to a temporal order in which the character is input and spatial separation information;

a search order determiner which determines an order of searching for the divided segments;

a spotting unit which compares a query phrase segment having a highest search order according to the determined search order with memo segments using a spotting table to find a cell indicating a first degree of similarity exceeding a first predetermined threshold value; and a neighborhood searching unit which searches a neighborhood of the found cell and checks whether an entire query phrase includes a portion matched with a portion of the input memo, wherein, when the neighborhood searching unit searches the neighborhood of the found cell, the neighborhood searching unit performs a search in a diagonal direction from the found cell, determines candidates for a node to be subsequently selected using horizontal expansion and vertical expansion, and expands the search from a node indicating a highest similarity among the candidates according to a best first search method, until a top and a bottom of the spotting table are encountered, wherein the matched portion indicates a portion in the input memo corresponding to a path of the search performed until the top and the bottom of the spotting table are encountered, when a degree of accumulated similarity obtained from the path exceeds a second predetermined threshold value, and wherein when the subsequent node is selected from among the candidates according to vertical expansion, the degree of accumulated similarity is expressed by:

$$\frac{l_i \cdot C_{S_i,T_{j_i}} + (l_{i+1} + l_{i+2}) \cdot C_{S_{i+1 \sim i+2},T_{j_{i+1}}}}{l_i + l_{i+1} + l_{i+2}},$$

where $l_i$ indicates a length of a query phrase segment used at a current node, $l_{i+1}$ indicates a length of an expanded query phrase segment at a first subsequent node, $l_{i+2}$ indicates a length of an expanded query phrase segment at a second subsequent node, $C_{S_i,T_{j_i}}$ indicates a second degree of similarity between an i-th segment in the query phrase and a $j_i$-th segment in the memo, and $C_{S_{i+1 \sim i+2},T_{j_{i+1}}}$ indicates a third degree of similarity between a combination of an (i+1)-th segment and an (i+2)-th segment in the input query phrase and a $j_{i+1}$-th segment in the input memo.

13. An apparatus for searching for a digital ink query, comprising:

a preprocessing unit which removes at least one unnecessary portion from digital ink data of at least one of an input query phrase and an input memo to reduce an amount of information of the digital ink data;

a feature extraction unit which extracts a feature vector from the reduced digital ink data;

a query searching unit which searches the input memo in units of segments for a portion of the input memo that matches a segment of the input query phrase; and a memo database which, when an input stroke is memo data, stores the memo data in the form of the feature vector extracted by the feature extraction unit, and when the query phrase is searched for, provides the stored memo data to the query searching unit, wherein the digital ink data comprises binary pixel data that is digitized from the at least one of the input query phrase and input memo, wherein the query searching unit comprises:

a segment divider which divides a character expressed by the feature vector into divided segments using temporal information related to a temporal order in which the character is input and spatial separation information;

a search order determiner which determines an order of searching for the divided segments;

a spotting unit which compares a query phrase segment having a highest search order according to the determined search order with memo segments using a spotting table to find a cell indicating a first degree of similarity exceeding a first predetermined threshold value; and a neighborhood searching unit which searches a neighborhood of the found cell and checks whether an entire query phrase includes a portion matched with a portion of the input memo, wherein, when the neighborhood searching unit searches the neighborhood of the found cell, the neighborhood searching unit performs a search in a diagonal direction from the found cell, determines candidates for a node to be subsequently selected using horizontal expansion and vertical expansion, and expands the search from a node indicating a highest similarity among the candidates according to a best first search method, until a top and a bottom of the spotting table are encountered, wherein the matched portion indicates a portion in the input memo corresponding to a path of the search performed until the top and the bottom of the spotting table are encountered, when a degree of accumulated similarity obtained from the path exceeds a second predetermined threshold value, and wherein when the subsequent node is selected from among the candidates according to vertical expansion, the degree of accumulated similarity is expressed by:

$$\frac{l_i \cdot C_{S_i,T_{j_i}} + l_{i+1} \cdot C_{S_{i+1},T_{(j_{i+1}) \sim (j_{i+1}+1)}}}{l_i + l_{i+1}},$$

where $l_i$ indicates a length of a query phrase segment used at a current node, $l_{i+1}$ indicates a length of an expanded query phrase segment at a first subsequent node, $l_{i+2}$ indicates a length of an expanded query phrase segment at a second subsequent node, $C_{S_i,T_{j_i}}$ indicates a second degree of similarity between an i-th segment in the input query phrase and a $j_i$-th segment in the input memo, and $C_{S_{i+1},T_{(j_{i+1}) \sim (j_{i+1}+1)}}$ indicates a third degree of similarity between the (i+1)-th segment in the input query phrase and a combination of the $j_{i+1}$-th segment and a $(j_{i+1}+1)$-th segment in the input memo.

* * * * *